(12) United States Patent
Williams et al.

(10) Patent No.: US 12,167,109 B2
(45) Date of Patent: *Dec. 10, 2024

(54) CAPTURING CONTENT IN A MOBILE COMPUTING PLATFORM

(71) Applicant: Medal B.V., Naarden (NL)

(72) Inventors: Ted R Williams, Mendocino, CA (US); Wilhelmus W. A. de Witte, Long Beach, CA (US); Brandon Paul Cohen, Long Beach, CA (US)

(73) Assignee: MEDAL B.V., Naarden (NL)

( * ) Notice: Subject to any disclaimer, the term of this patent is extended or adjusted under 35 U.S.C. 154(b) by 541 days.

This patent is subject to a terminal disclaimer.

(21) Appl. No.: 17/506,787

(22) Filed: Oct. 21, 2021

(65) Prior Publication Data

US 2022/0038795 A1 Feb. 3, 2022

Related U.S. Application Data

(63) Continuation-in-part of application No. 17/117,208, filed on Dec. 10, 2020, now Pat. No. 11,188,760.

(Continued)

(51) Int. Cl.
*A63F 9/24* (2006.01)
*H04N 21/2187* (2011.01)
(Continued)

(52) U.S. Cl.
CPC ..... *H04N 21/8549* (2013.01); *H04N 21/2187* (2013.01); *H04N 21/25891* (2013.01); *H04N 21/2743* (2013.01); *H04N 21/84* (2013.01)

(58) Field of Classification Search
CPC ........ A63F 2300/807; A63F 2300/6009; A63F 2300/552; A63F 2300/535; A63F 13/822; A63F 13/85; A63F 13/33; A63F 13/12; H04N 21/8549; H04N 21/2187; H04N 21/25891; H04N 21/2743; H04N 21/84
(Continued)

(56) References Cited

U.S. PATENT DOCUMENTS 8,984,628 B2 *   3/2015   Mahaffey  ............... H04W 12/10
                                                        713/188
9,396,354 B1 *   7/2016   Murphy  ................... G06F 21/32
(Continued)

*Primary Examiner* — Michael A Cuff
(74) *Attorney, Agent, or Firm* — Woods Rogers PLC; Timothy Bechen

(57) ABSTRACT

A computerized method and system for mobile application clip detection and capturing on a mobile computing device includes receiving a user consent for capturing screen content by a content capture executable. The method and system includes executing the content capture executable in a background and monitoring processing operations in a foreground of the mobile computing device. Upon detecting capturable content from a application executable executing in the foreground, buffering screen content in a first memory device for a first period of time. The method and system includes executing the content capture executable in the foreground, including receiving a clip generation command from the user and generating a content clip from at least a portion of the screen content in the first memory device. Therein, in response to a clip distribution command, the clip is distributed across a networked connection.

20 Claims, 8 Drawing Sheets

Related U.S. Application Data

(60) Provisional application No. 62/946,360, filed on Dec. 10, 2019.

(51) Int. Cl.
  *H04N 21/258*   (2011.01)
  *H04N 21/2743*  (2011.01)
  *H04N 21/84*    (2011.01)
  *H04N 21/8549*  (2011.01)

(58) Field of Classification Search
  USPC .......................................... 463/43; 386/241
  See application file for complete search history.

(56) References Cited

U.S. PATENT DOCUMENTS

| | | | | |
|---|---|---|---|---|
| 10,511,705 B2* | 12/2019 | Li | ............................ | H04L 47/12 |
| 10,691,740 B1* | 6/2020 | Anorga | .................... | G06F 16/44 |
| 2006/0166648 A1* | 7/2006 | Roach | .................... | H04W 12/08 |
| | | | | 455/411 |
| 2007/0162971 A1* | 7/2007 | Blom | .................... | H04L 67/303 |
| | | | | 726/17 |
| 2015/0172266 A1* | 6/2015 | Krug | ........................ | H04L 51/52 |
| | | | | 726/4 |
| 2015/0332318 A1* | 11/2015 | Gauss | .................... | G06Q 50/01 |
| | | | | 705/14.47 |
| 2016/0036734 A1* | 2/2016 | Ruth | ........................ | H04L 51/10 |
| | | | | 709/206 |
| 2017/0006322 A1* | 1/2017 | Dury | .................... | H04N 21/254 |
| 2017/0331952 A1* | 11/2017 | Rogers | .................... | H04W 4/02 |
| 2018/0104588 A1* | 4/2018 | Zhang | ................ | G06F 3/04883 |
| 2018/0365270 A1* | 12/2018 | Azout | .................... | G06F 3/013 |
| 2019/0244483 A1* | 8/2019 | Collins | ................ | A63F 13/352 |
| 2019/0329134 A1* | 10/2019 | Shriram | .................. | H04N 21/4781 |
| 2019/0354191 A1* | 11/2019 | Reynolds | .............. | H04N 5/772 |
| 2020/0274861 A1* | 8/2020 | Black | .................... | G06N 5/046 |
| 2020/0387268 A1* | 12/2020 | Shipman | ................ | G05B 15/02 |

* cited by examiner

CAPTURING CONTENT IN A MOBILE COMPUTING PLATFORM

RELATED APPLICATIONS

The present application is a continuation-in-part of and claims priority to U.S. patent application Ser. No. 17/117,208 entitled "METHOD AND SYSTEM FOR GAMING SEGMENT GENERATION IN A MOBILE COMPUTING PLATFORM" filed Dec. 10, 2020, which relates to and claims priority to U.S. Provisional Patent No. 62/946,360 filed Dec. 10, 2019.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to content generation and distribution systems and more specifically to content generation and distribution of application content from a mobile computing device.

BACKGROUND

There has been a growing trend for generating and distributing gameplay content. The content is often referred to as a livestream because it is a stream of the live gameplay. The livestream can be distributed in real-time as the player is actively playing the game or can be recorded and later distributed.

Users actively engaged and focused on playing the video game are limited in livestream content management. Distributing gameplay in a delayed or curated fashion requires further processing requirements as well as storage to store prior gameplay content. Because of the volume of distributed gameplay content, players seek to distributed selected gameplay sequences.

The nature of dynamic gameplay is that often the player cannot know ahead of time if the gameplay sequence is worth capturing and distributing. In desktop and game console systems, memory and processing power allow for dynamic capturing of extended sections of gameplay, allowing for the user to later select segments for distribution.

This content capture is not limited to gameplay. For example, content capture can be for any mobile application. In one example, a user wishes to retroactively record a sequence of interactions in a social media application, capturing interactions with other users. In another example, a user may be capturing health data from an exercise or biometric application and retroactively seek to record or memorialize the content capture.

In mobile computing platforms, problems exist with content clip generation. Mobile computing platforms have limited memory and processing capability, such as found in the two mobile platforms of Android® from Alphabet Inc. of Mountain View, CA and iOs® from Apple, Inc. of Cupertino. These mobile platforms lack processing power to actively run two programs in the processing foreground. These mobile platforms also lack memory to buffer or store larger quantities of content, where memory can qualify as either random access memory or volatile memory.

Thus, there is a need for technical solutions allowing for application content clip generation and distribution from these mobile processing platforms.

BRIEF DESCRIPTION

The method and system provides for mobile application clip detection and capture within a mobile computing device. The mobile computing device operates on a mobile computing operating system, such as but not limited to the Android® computing platform.

The mobile computing device includes a processing device executing software executables via the mobile operating system. The mobile computing device additionally coordinates user interfacing via one or more mobile device user interface, for example a touch screen, haptic interface, physical buttons, phone sensors, etc.

The method and system includes executing a content capture executable via the mobile operating system software. The content capture executable is executed in a foreground execution by the processing device. The foreground execution is execution with active user interfacing including a graphical output display and receiving user input interaction via the mobile device user interface.

While the content capture executable executes in the foreground execution, the method and system includes receiving a user consent from a user via the mobile device user interface. For example, the user consent can include a touchscreen authorization. The user consent is authorizing the mobile device to capture screen content by a content capture executable.

The nature of mobile computing devices restrict executables to either a foreground execution in a foreground position or a background execution in a background position. The foreground position is understood as executing with direct user interface and interaction, such as being directly visible and actively engaged by the user. By contrast, the background position may include the mobile processing device executing operations without direct user engagement.

In the method and system, the content capture executable is executed by the mobile processing device. Initial foreground execution is in the foreground position. After receipt of the user consent, the executable can then be transferred to background execution in the background position.

The method and system includes monitoring processing operations in the foreground of the mobile computing device. Monitoring can be performed by the content capture executable executing in the background execution. Varying techniques can be used to monitor the processing operations, including for example monitoring battery and processing usage details.

Based on the monitoring of the processing operations, the method and system includes detecting capturable content from an application executable executing in the foreground execution on the processing device based on processing operations. In this example, higher battery usage and increase processing usage can indicate an application executable being executed in the foreground execution on the mobile processing device. In another embodiment, capturable content detection can include detecting or recognizing one or more z-order events occurring within an on-screen display, such as by monitoring operating system executables.

The method and system buffers screen content of the capturable content of the application executable. This screen content is buffered in a first memory device for a first period of time. Limited memory in mobile devices complicates buffering content. The first period of time can be set based on memory resources, allowing for content buffering without overwhelming the memory resources.

The memory device can also be a circular buffer, whereby in a second period of time, the new buffered content can overwrite prior content. Based on memory and processor settings, the first time period and the second time period can be the same, allocating a buffer to record and overwrite content at the same time period. In another example, the second time period can be smaller than the first time period, such as allowing for multiple buffering segments or sessions.

During the screen content capture, the content capture executable executes in the background execution. Mobile processing devices typically restrict foreground execution to a single application, thus the application executable operates in the foreground execution, the detecting of capturable content and buffering screen content being performed as background execution.

After content capture, the method and system executes the content capture executable in the foreground execution. The content capture executable can include user interface functionality.

The method and system includes receiving a clip generation command from the user and generating a content clip from at least a portion of the screen content in the first memory device based on the clip generation command. For example, via a touchscreen user interface, the user can enter the clip generation command, which may include editing or truncating one or more segments of buffered screen content. For example, the buffered screen content may include 60 seconds of screen content, the user can select to use the full clip or can truncate to a shorter clip.

The method and system includes receiving a clip distribution command from the user and distributing the content clip across a networked connection based on the clip distribution command. Herein, the user can then provide the command to send or distribute the clip across a network external to the mobile processing device. For example, the clip can be sent via a dedicated clip distribution platform.

The method and system includes further operations for clip detection and capturing the mobile device. For example, public distribution of screen content is not appropriate for certain application executables. It can be a security violation if the executable application exposes personal or inappropriate content. Therefore, the method and system can further inhibit screen content capture by determining an identity of the application executable executing the foreground execution on the mobile computing device and comparing the identity of the application executable against a reference table. The reference table can include a list of approved executables. The method and system then authorizes screen capture for approved application executables and prohibits screen capture for unauthorized application executables.

The content capture executable may further include user interface functions for personalizing or attaching a screen name or profile name to distributed content. For example, the user may have a dedicated account with a distribution service or server. Via the content capture executable, the user can then personalize or allow proper electronic attribution of the content clip to his or her user profile. This user profile may also be beneficial for content distribution, such as being distributed to subscribers or other users following the user. Other interfacing operations can include adding tags or other identifiers with the clip, such as the name of the application, the mobile computing device, a location, a time, an activity visible in the clip, among others.

Thereby, the method and system provides for clip detection and generation in a mobile computing device. The user consent received in a foreground execution authorized background execution screen capture operations. The monitoring of processing operations minimizes background processing load requirements. The use of time-limited buffering operates within the memory-restrictions of the mobile computing platform. And the alternating between foreground and background execution allows for application execution in the foreground execution with appropriate screen content buffering in the background execution, as well as foreground clip generation and distribution.

BRIEF DESCRIPTION OF THE DRAWINGS

A better understanding of the disclosed technology will be obtained from the following detailed description of the preferred embodiments taken in conjunction with the drawings and the attached claims.

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

In one embodiment, the mobile application can execute any mobile application on the operating system. The application can be a gaming application, but can also be any other type of application, including but not limited to, a utility application, a productivity application, a social media application, a viewer application, a health care tracking application, a mapping or positioning application, etc.

Figure 1:
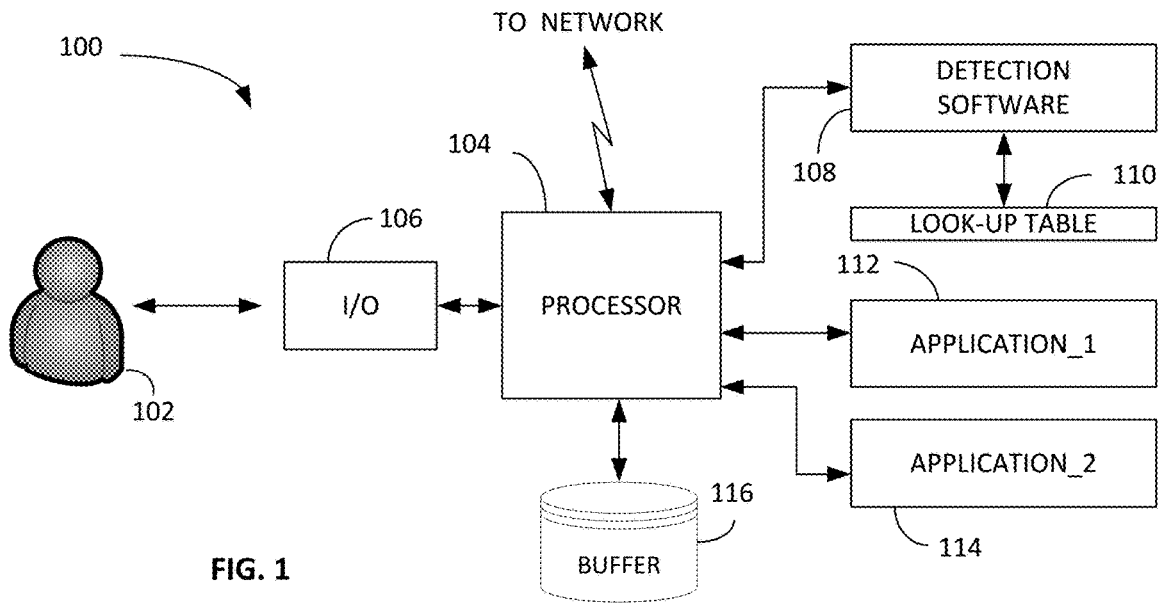
FIG. 1 illustrates a mobile computing device with user interaction.

FIG. 1 illustrates a mobile computing device 100 including processing functionality for videogame clip detection and capturing. The mobile device 100 is accessible by a user 102.

The mobile device 100 includes a processor 104, an input/output interface 106, detection software 108, a look-up table 110, applications 112, 114, and a buffer 116. Additionally, the mobile device 100 includes communication with a network via wireless connectivity.

The mobile device 100 can be any suitable mobile computing device operating a mobile computing operating system (OS) software. The mobile device 100 may be a smartphone, tablet, or similar device with a smaller or reduced screen for aiding mobility. The mobile device 100 differs from known laptop, desktop, or similar computing device(s), where the mobile device 100 operates primarily as a phone or other communication device, including the ability to run mobile device gaming executables on the mobile computing OS software.

For clarity purposes, the mobile device 100 can be a mobile phone, such as a Samsung S-line phone available from Samsung Electronics, an Apple iPhone available from Apple, Inc., or any other mobile phone.

In the mobile device 100, the processor 104 can be one or more mobile processing chipsets including both central processing and graphics rendering functionality. The processor 104 operates the mobile OS software. By way of example, the software may be an Android® OS available from Alphabet, Inc. In other example, the software may be an Apple iOS available from Apple, Inc.

The input/output (i/o) interface 106 can be a combination of hardware and software enabling and facilitating interaction with the user. The i/o interface 106 can include a touchscreen providing video output display, as well as receiving user input. The i/o interface 106 may include audio/visual interfacing including audio output and audible input recognition via a microphone. The i/o interface 106 may include haptic output, such as a vibration and may include motion control or detection for input, such as detecting a user shaking or tilting the device 100. Further i/o interface 106 elements are within the scope of the method and system, including a camera for visual input, wireless connectivity to headphones or other output devices, by way of example.

The detection software 108 is executable processing code stored in a memory buffer and subsequently executed by the processor 104. The software 108, upon execution, creates transformative operations providing technical solutions for videogame clip detection and capturing as described herein.

The look-up table 110 may be any suitable memory or other table structure storing gaming information. The table 110 may be locally stored in the device 100, or in another embodiment can be stored on the network and accessed via the wireless connectivity.

Application one 112 and application two 114 are also executable software code executed by the processor 104. These software executables represent mobile applications, also referred to as apps, on the mobile computing device. Examples of applications 112, 114 can be videogame applications, news applications, social media applications, utility applications, or any other suitable application. The applications 112, 114 can be downloaded from a central mobile application store and stored directly on the device.

The buffer 116 can be any suitable storage device or devices within the mobile device 100. The buffer 116 can be, in one embodiment, a circular buffer, or a standard buffer with overwrite capabilities mirroring a circular buffer. In the mobile device 100, the space available in the buffer 116 is limited, thereby the detection software 108 operates to efficiently utilize available memory space.

Figure 2:
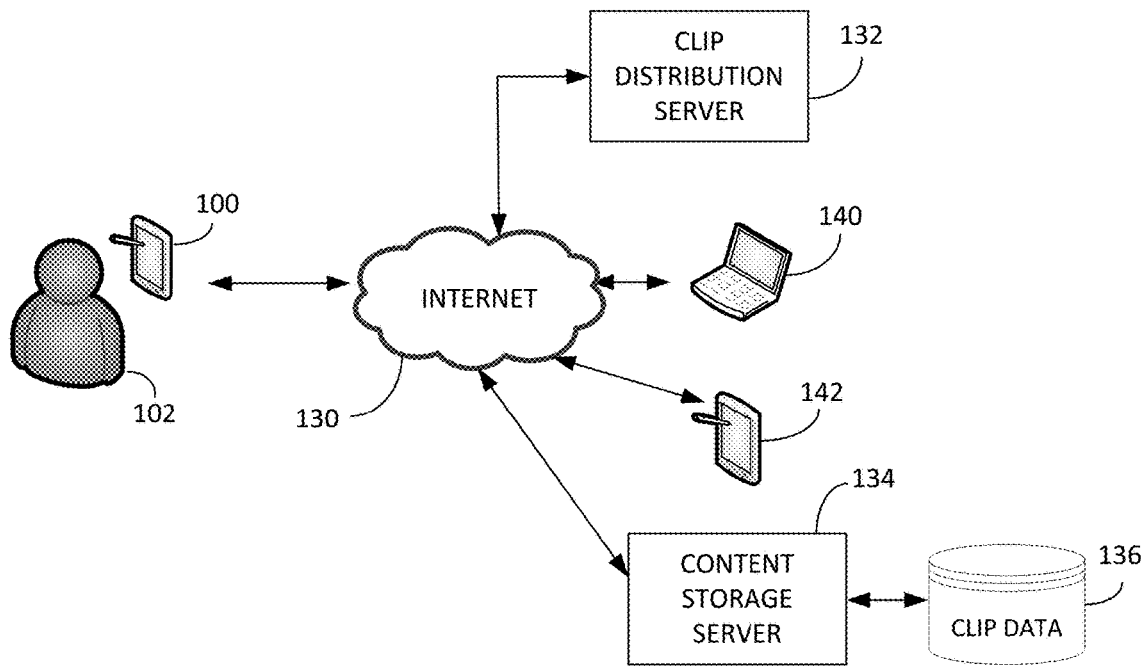
FIG. 2 illustrates a processing system including a mobile gaming device and a clip distribution server.

FIG. 2 provides further environmental operation context for the mobile device 100 as used by the user 102. The mobile device 100, performing operations described in further detail herein, engages the Internet 130 via mobile communication protocols. The Internet 130 can also be any suitable network, public and/or private network, and may include intermediary network connections, such as a wireless network or a mobile telephone network connecting to the Internet 130. For example, the mobile device 100 may use a cellular network from a cellular carrier to reach the network 130. Communication across and connections to the Internet 130 use existing and well-known protocols.

The mobile device 100 connects to a clip distribution server 132 via the network 130. The server 132 can be one or more network-based devices sharing or facilitating distribution of content. The server 132 can include account information for users to submit content for distribution, as well as other users to maintain account data and receive content distribution. In one example, the server 132 can be accessible via a dedicated URL or other network addressing. In the example of a mobile application, the application can directly communicate with the server via one or more addresses embedded in the application.

Via a website or via a mobile application, users can manage account information for content distribution, for example signing up to receive content from specific users, search and requesting gameplay for a specific game, receiving recent or trending content, by way of example. Moreover, the server 132 can receive incoming content, videogame gameplay clips, and redirect the content back out across the network 130.

In addition to distribution, a content storage server 134, with clip data 136, can also store content for retrieval instead of distribution. For example, the server 134 may operate to push content out to subscribers. In another example, the content storage server 134 may allow for users to pull content therefrom by accessing and retrieving the content. The server 134 can be one more processing devices in a cloud-based or other network configuration with data storage 136 available across the network in accordance with known cloud-based computing techniques.

FIG. 2 additionally illustrates the distribution of content, in this example a laptop computer 140 and a second mobile device 142. As described in further detail below, the distribution of content is distributed to these devices for subsequent viewing of the gameplay segment(s).

Figure 3:
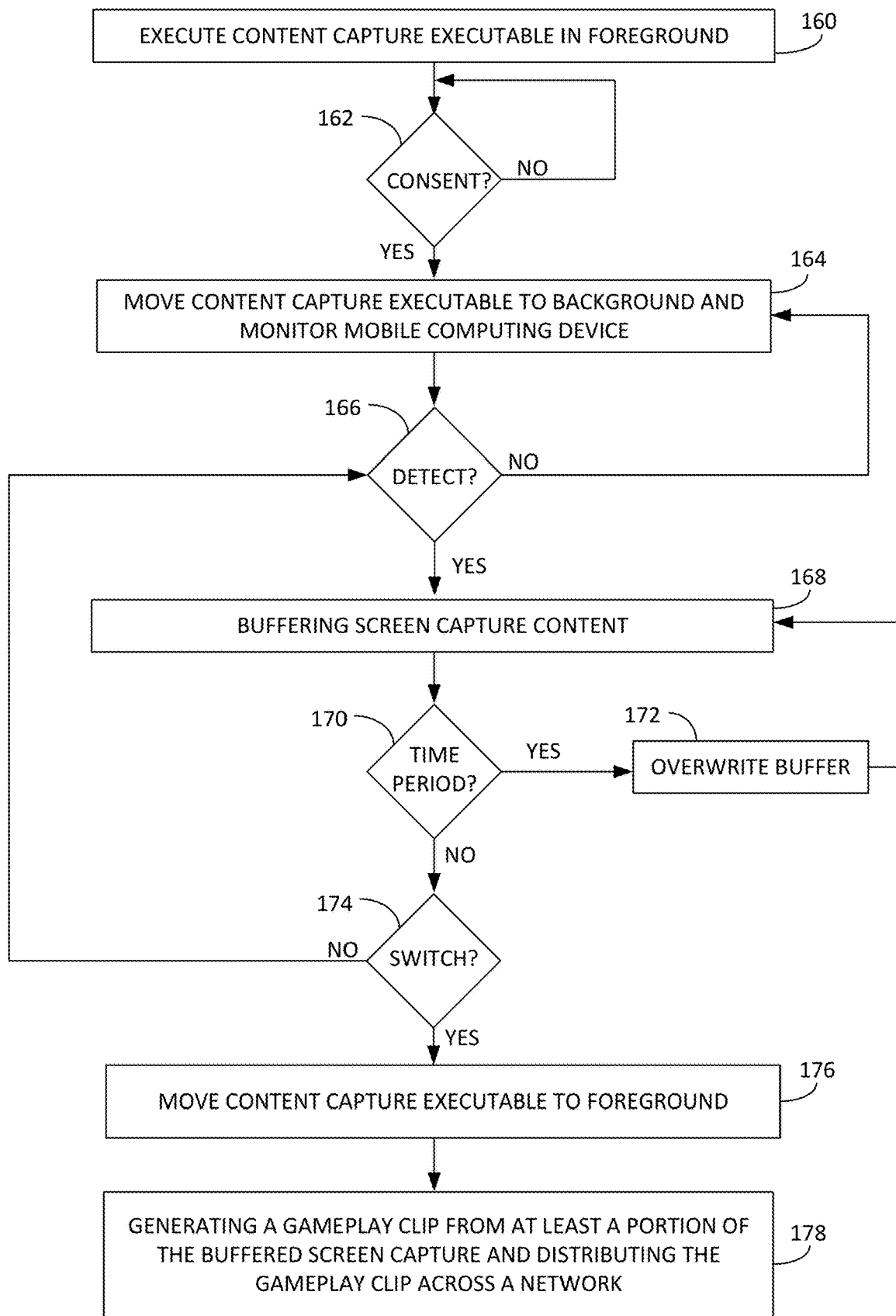
FIG. 3 illustrates a flowchart of the steps of one embodiment of a method for clip generation in a mobile computing device.

More specific to the computerized method and system, FIG. 3 illustrates a flowchart of the steps of an exemplary embodiment for the mobile device 100 of FIG. 1 providing a method and system for videogame clip detection and capturing on a mobile computing device. Step 160 is to execute a content capture executable in a foreground execution on the mobile computing device.

Mobile computing platforms have limited processing capabilities and screen space. Thus, foreground execution is directing the application to execute for direct user input and output. The foreground execution of an application is the application to which the user actively engages. By contrast, the mobile device can operate applications in a background execution, which includes continuing to perform processing operations but not directly engaging the user for input and output functions.

While operating in the foreground, the content capture executable can include any number of functions or features, such as a user account login, setting preferences, or other features. Because of security and platform restrictions, the user may be required to give consent for screen or content capturing on the mobile device. The content capture executable 160 requests user consent for capturing content. This may be via a pop-up window or other user interface.

Step 162 is detecting if the user grants consent. If no, the method reverts until granted. Once granted, the method proceeds.

Step 164 is moving the content capture executable to background execution and monitoring the mobile computing device. Here, the executable continues to perform processing operations, but omitting direct interfacing with the user. The monitoring of the processing operations of the mobile computing device can include any number of techniques, including for example tracking the amount of computing power and memory requirements actively being used by the mobile device.

The computing method and system may include additional techniques for content capture in varying embodiments. For example, one technique may include a voice command from the user. This technique may utilize a voice recognition engine associated with the mobile device. Another technique may be a hotkey combination with the mobile device. For example, common techniques include double-tapping a home button for electronic payment, depressing the home button and a side button for a screen capture. A hotkey selection can be made available via the mobile operating system to enable game recordation without disrupting current gameplay, e.g. requiring the user to switch active foreground application(s) to then manually turn on recording functions.

Once the content capture executable is in the background, the mobile device executes other applications in the foreground, for example application 112 of FIG. 1. As the user executes these other applications, one of them may be a videogame.

The user, engaging the mobile device, executes an application in the foreground. Meanwhile, the content capture executable monitors via background execution. Therefore, step 166 is if gameplay is detected.

Step 166 can include additional steps beyond the monitoring, including verifying the application is an acceptable application for screen capture. For example, if monitoring is based on processor and memory, a false detection may occur from an application that is not actual gameplay but has processor and memory attributes akin to gameplay.

Additionally, even if monitoring detects gameplay, the application being played may not be suitable for clip detection and distribution. Therefore, one embodiment includes determining an application identifier representing the application being executed in the foreground position. This application identifier is a universal identifier assigned to the application as part of mobile device application (app) distribution via a centralized operating system store. Therefore, gameplay detection may include referencing the application identifier against a table with a reference list of acceptable games or executables approved for content distribution. The reference list can be generated directly from the operating system store or via any other suitable source.

In step 166, if the application is not gameplay, or is not an acceptable application, recordation of content capture can be prohibited. The method reverts back to step 164 to continue monitoring. For example, if the user then quits the current application (e.g. application 112 of FIG. 1) and launches a new application (e.g. application 114 of FIG. 2), the content capture executable continues to actively monitor.

Upon detecting acceptable gameplay, step 168 is buffering screen capture content. The content capture executable continues executing in the background, allowing the user to maintain engagement with the executing application, e.g. videogame. The content capture executable captures screen content without disrupting or interrupting the gameplay. The user consent of step 162 remains active and current because the content capture executable continues to execute.

Buffering of screen content capture has specific limitations because of operating in the mobile environment with limited storage capacities. Therefore, step 170 is determining a time period for content capture. This time period, which may be defined by the user or can be defined by calculating available memory resources, avoids unnecessarily filling up all available memory on the mobile device.

In one embodiment, the memory device can be a circular buffer. After a defined time period, step 172 includes overwriting prior buffered content. For example, the time period may be for a period of 60 seconds with overwriting occurring after this 60 seconds.

The method and system, with dynamic buffering of gameplay, allows for capturing content that has previously occurred in a videogame. The user maintains focus on the gameplay with the content capture executable running the background. Active buffering therefore improves clip detection of already-occurred events. Time periods and circular buffers allows for dynamic buffering accounting for mobile limitations.

The method detects if the user switches applications, step 174. If no, the method continues to detect content and buffer. In one example of switching applications, the user may have just completed a gaming sequence and now wishes to generate a clip.

Step 176 is moving the content capture executable to the foreground position. This foreground position now means the user is actively engaging with the content capture executable.

Step 178 is then, via user interface functions, generating a gameplay clip from at least a portion of the buffered screen capture. This step includes receiving a clip generation command from the user and generating a videogame clip. As noted above, gameplay sequences are dynamically buffered, whereby when the user now moves the executable to the foreground, these clip(s) are available from the mobile device memory. Generation of gameplay clip can include wholesale selection of one or more clips. Further embodiments can include editing clips, such as truncating clips to emphasize specific gameplay. Generation of gameplay clip can also include adding descriptive or identifier content, such as a metadata, descriptors, hashtags, game information, or other content.

The computing method and system can additionally account for capturing audio as part of the gameplay clip. The audio may be in-game audio, user generated audio, or a combination of both. When accounting for storage limitations, the video content is not stored on a frame-by-frame basis, instead using key frames with accounting for inter-frame video differences. Thus, the method and system stores audio in a separate file apart from the video. The audio is captured using audio capture recording techniques to write the audio content into a buffer. The nature of audio recording uses significantly less storage space, thus limitations associated with video storage are not found in the audio storage process.

The audio is captured using a timestamp or other tracking feature. The audio being separately stored is then later merged back with the video feed for content distribution. This merging is synchronized based on the timestamp.

Where the video content is stored using key frames, further modification of the audio file may be required. For example, if the recorded audio segment aligns outside of a key frame, the audio may be asynchronous. Therefore, further adjustment of the audio file may account for dropping audio content prior to a starting video key frame, ensuring synchronicity between audio and video.

Step 178 further includes distributing the gameplay clip across a network. This includes receiving a clip distribution command from the user and distributing the videogame clip across a networked connection. This distribution can include submitting the clip to a central server, such as a server 132 of FIG. 2. Content can be then be made available to other users via a push method from the server across web-based and/or app-based interfacing.

This distribution can include direct submission to other users or followers via one or more communication platform. This distribution can include uploading to a network storage location, such as a server 134 of FIG. 2 with a link made available for distribution.

Figure 4:
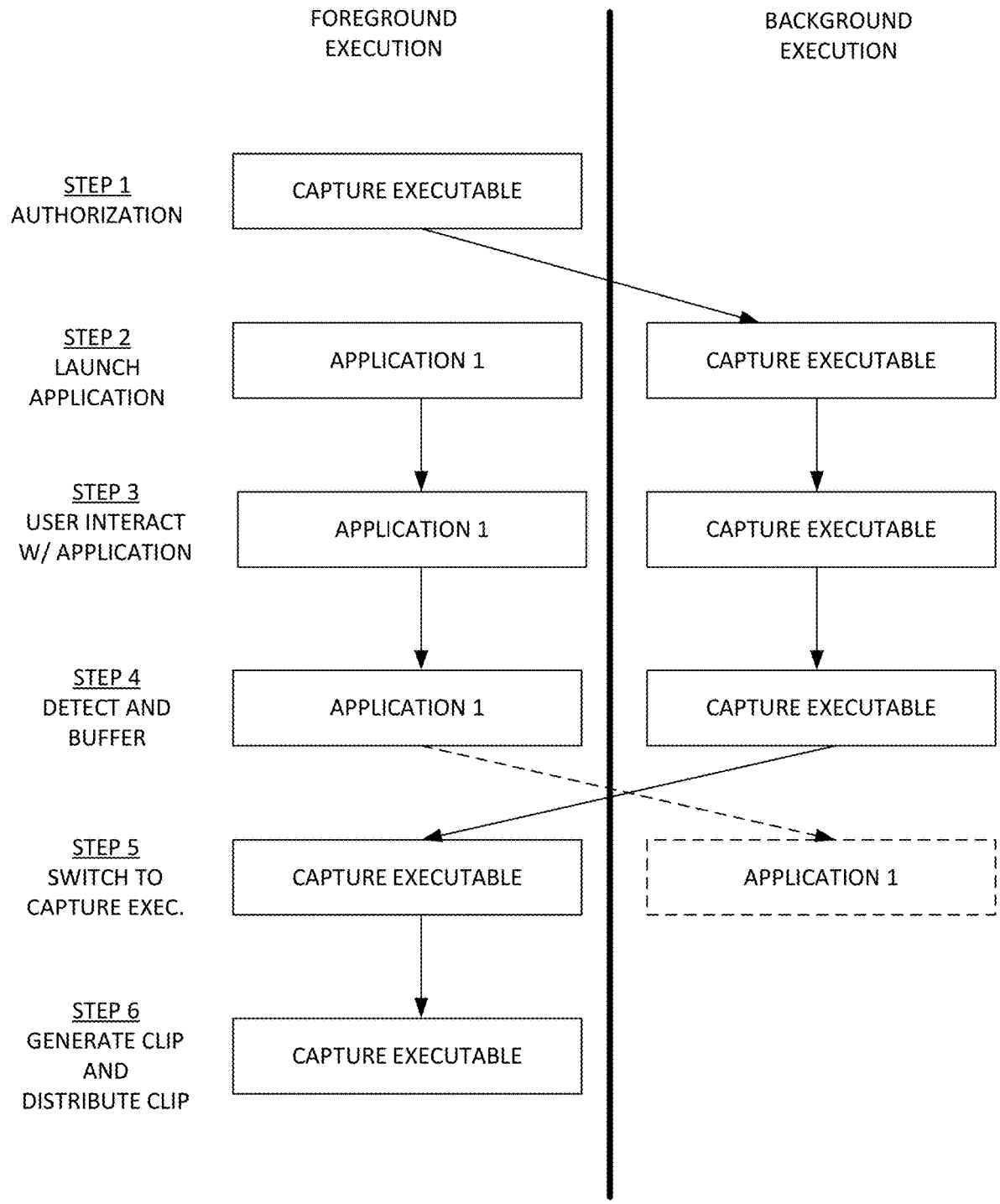
FIG. 4 illustrates flow diagram illustrating transition between foreground and background execution in the mobile computing device.

The method and system operates in the mobile computing environment by adjusting execution between the foreground execution and the background execution. FIG. 4 illustrates a sequential diagram showing execution of various executables in the different positions.

In step 1, the capture executable executes in the foreground position. This first step is the authorization step where a user authorizes content capture in the mobile device. Authorization satisfies security restriction and requirements in the mobile computing platform based on capturing screen content of other executables.

In step 2, the user can then launch a first application. The mobile operating system executes the first application in the foreground position, the capture executable in then moved to background execution. In this background execution, the capture executable continues performing processing operations.

In step 3, the user interacts with the first application, which continues to execute in the foreground position. In one example, if the application is a videogame, the user can be playing the videogame on the mobile computing device. The capture executable still executes in the background, including monitoring execution of the first application.

In step 4, the user continues to interact with the first application still in the foreground position. This could include the user continuing to play the videogame (first application). The capture executable executes in the background to detect and buffer content consistent with techniques described herein.

In step 5, the user either discontinues playing the videogame (first application) or can manually swap the foreground and background execution. In one example, the user may select a home button displaying screenshots of active applications running in the background, scroll through the thumbnails and select the capture executable to move it to the foreground position. In another embodiment, the user can return to a home screen and select an application thumbnail.

In step 5, the user switches to the capture executable, moving the capture executable to the foreground position. If the user is simply swapping positions, the first application can continue to execute in the background position, typically idle awaiting user input. If the user terminates the first application, the application is closed and no longer executes.

In step 6, the user generates the clip and distributes the clip. This step is performed via the capture executable, which continues to run in the foreground position.

Figure 5:
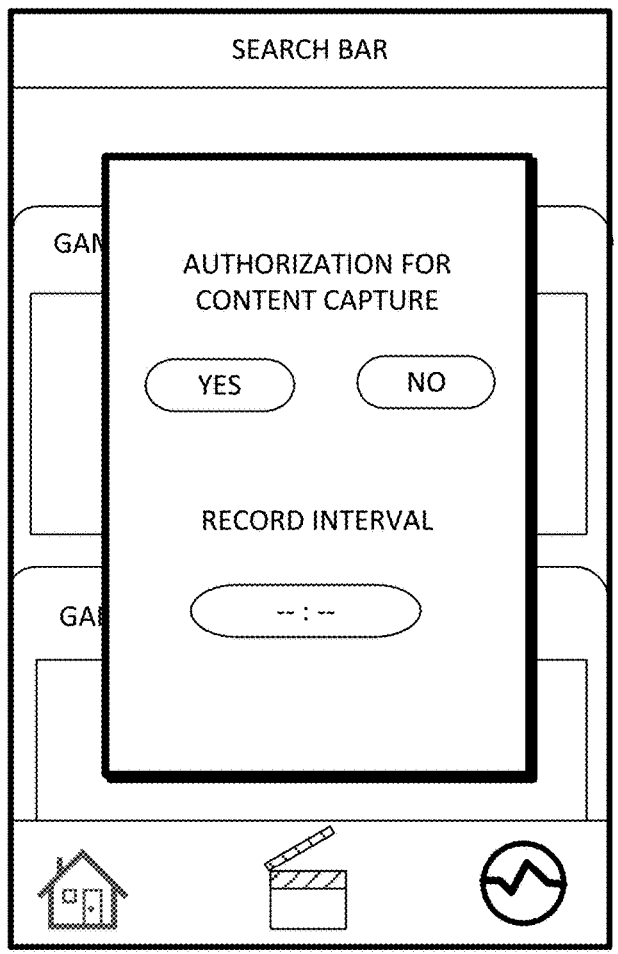
FIG. 5 illustrates a sample screenshot of a content capture executable on a mobile computing device.

For further illustration, FIG. 5 illustrates a sample screenshot of a content capture executable operating in a foreground position. The screenshot illustrates the content capture executable including a user interface window requesting authorization for capturing content.

In this embodiment, the user may also manually enter a record interval for a general clip. This interval can be the time period before a circular buffer overwrites existing content. Further embodiments can include recommendation of time intervals or preset intervals based on existing memory resources. For example, if the mobile device has limited available memory, the interval can be preset at a smaller number or can be restricted to a specific time limit indicating the amount of available memory space.

Figure 6:
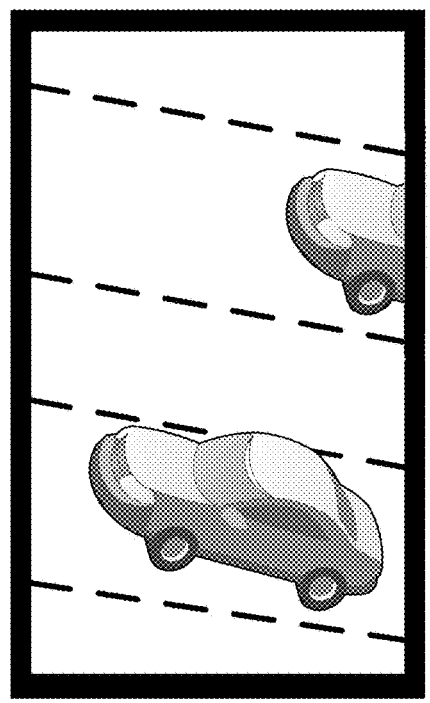
FIG. 6 illustrates a screenshot of a videogame being executed on the mobile computing device in a vertical mode.

The user can select the Yes button, here generating the general content capture authorization. The user may then manually change applications, such as selecting a gaming application. FIG. 6 illustrates a screenshot of a sample driving game. This application runs in the foreground position, the content capture executable moved to the background position.

Figure 7:
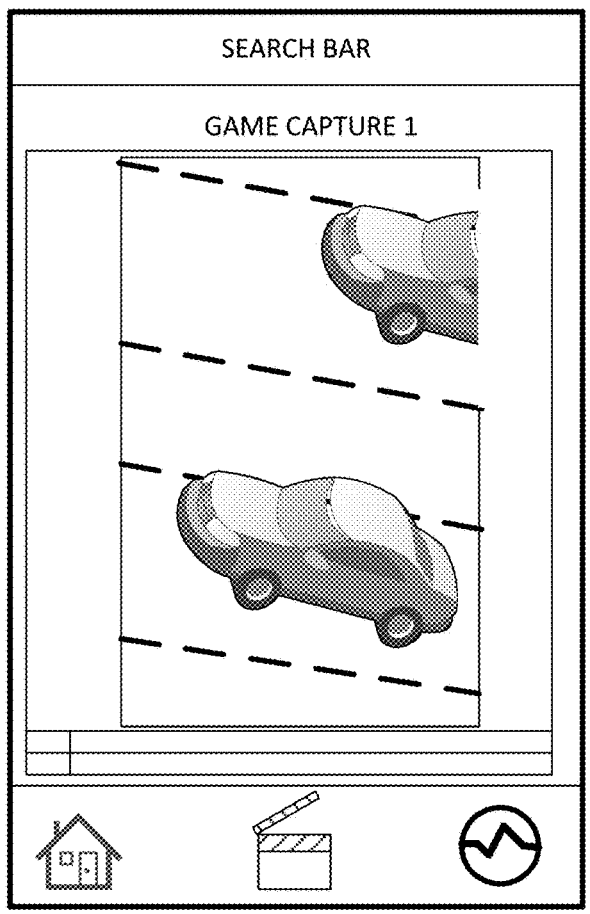
FIG. 7 illustrates a screenshot of a content capture window within the content capture executable.

The user plays the game, the content capture detecting gameplay and capturing content. After completion of a period of gameplay, FIG. 7 illustrates a screenshot of the user moving the content capture executable to the foreground position. This screenshot shows recorded content, here two cars racing. Below the content is a time bar.

Figure 8:
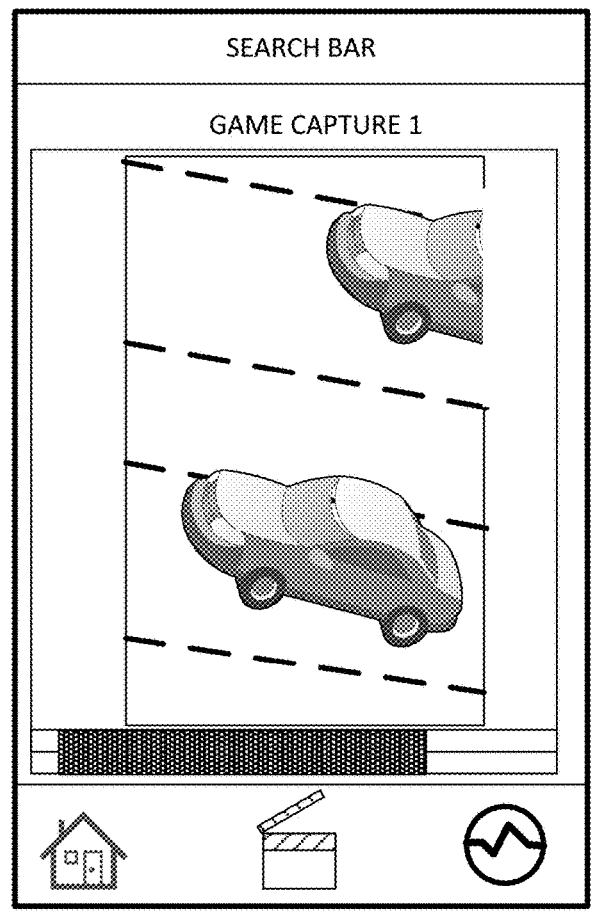
FIG. 8 illustrates a user interface function for selecting and generating a videogame clip.

FIG. 8 illustrates clip generation commands, including selecting a portion of the clip. Here, a portion of the time is highlighted, selecting that specific portion for inclusion in the clip. Consistent with known clipping techniques, the non-highlighted portions may be discard. For example, if the total scene is 60 second long, the clip can be truncated to a specific 34 second portion, the extraneous 26 seconds are discarded.

Figure 9:
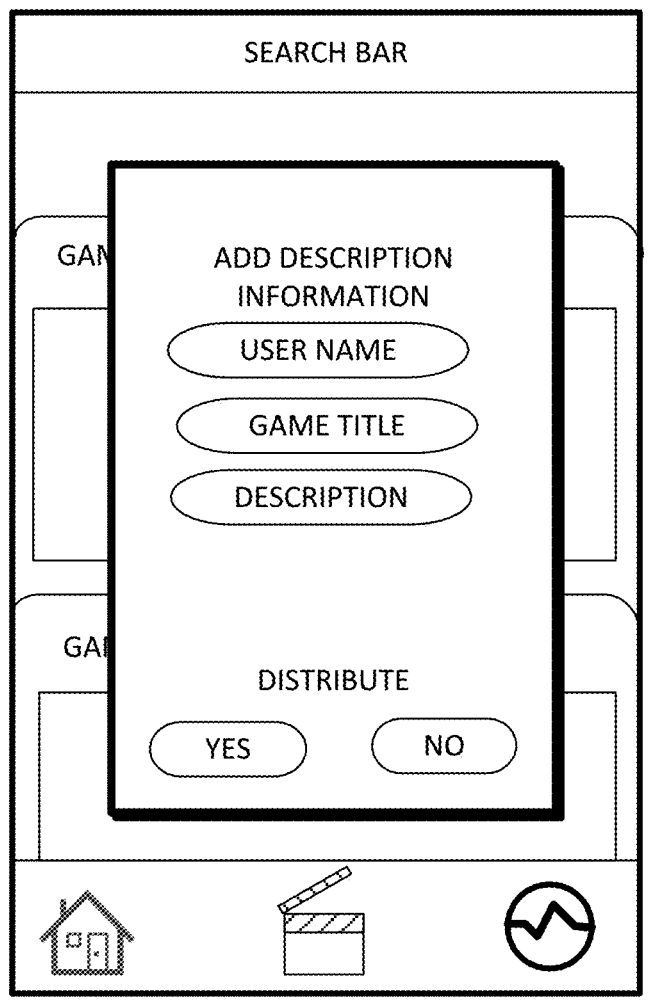
FIG. 9 illustrates a user interface function for adding descriptive content to the videogame clip and receiving a clip distribution command.

FIG. 9 illustrates a screenshot of further clip generation commands, including adding descriptions or other identifiers. These fields can be user-generated content or can be recommended content based on existing game or user profile information. Further in the screenshot, a clip distribution command here is a selection button to either distributed or save the generated clip. As described above, upon selection of the clip distribution command, the clip can then be distributed across a network connection for further distribution.

Operating in a mobile computing device includes additional processing specifics, such as screen orientation and view mode. A mobile device can be operated in a vertical (portrait) mode, or a horizontal (landscape) mode. The screen capture differs based on these modes. Additionally, different games are designed for different modes, therefore the content capture and clip generation can further account for this orientation mode.

Figure 10:
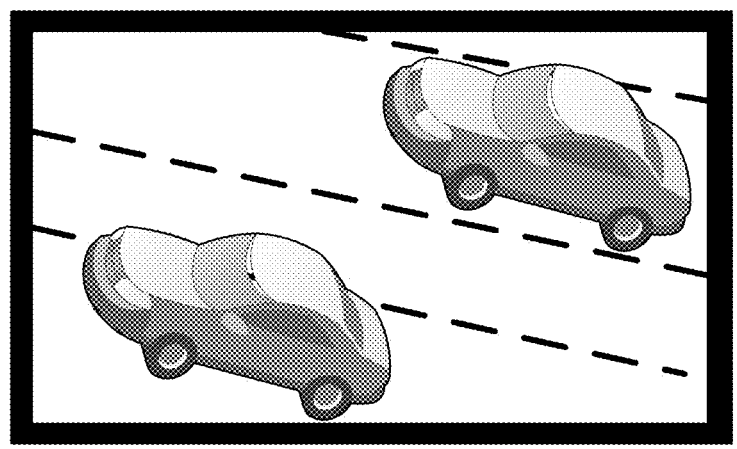
FIG. 10 illustrates a screenshot of a videogame being executed on a mobile device in a horizontal mode.

FIG. 6 above illustrated the exemplary racing game in vertical mode. FIG. 10 illustrates the mobile device and game in a horizontal mode. In this mode, the width of the display is greater than the height of the display.

Different games can operate in different modes. Some games operate solely in one mode, while other games can alternate modes. Alternating modes can be in response to the user selecting to rotate the mobile device, or a game may have a gameplay sequence to be performed in one mode with normal gameplay in another mode.

Mobile devices, via the mobile operating system, include mode detection routines using known operations. In normal mobile device operation, the user can rotate the phone ninety degrees, the screen automatically updating display between modes. This updating can include resizing a display screen as appropriate.

The display orientation is not something provided by the game application, but rather is something typically performed when translating gameplay processing by the game application to display on an output screen.

During operation of the mobile device, the user can rotate the orientation of the device, e.g. switching from portrait to landscape mode. Therefore, the content capture executable, writing content, continues to write the same gaming content without knowledge of the orientation.

Generating gaming clips seeks to mirror the user's display orientation. Therefore, in one embodiment the content capture executable can include executable instructions to determine or otherwise recognized gameplay orientation.

One embodiment may include using frame data to detect orientation. The frame data can be extracted via an API or can be extracted from any suitable output display processing routine.

For example, to detect orientation, the system can use the aspect ratio or black bars from the frames to determine whether the user is playing the game on the mobile device in either horizontal or vertical (portrait or landscape) mode.

One orientation detection technique uses edge detection and determines an amount of whitespace or amounts of visible straight lines. The mobile device typically operates in a 16:9 aspect ratio, therefore the length of a line can indicate specific orientation.

A further embodiment for orientation detection can use machine learning processing. For example, machine learning can include known data sets indicating existing images in known orientations. Visual or processing comparisons of different images allows for learning if processing a sequence of images is within the vertical or horizontal orientation.

Figure 11:
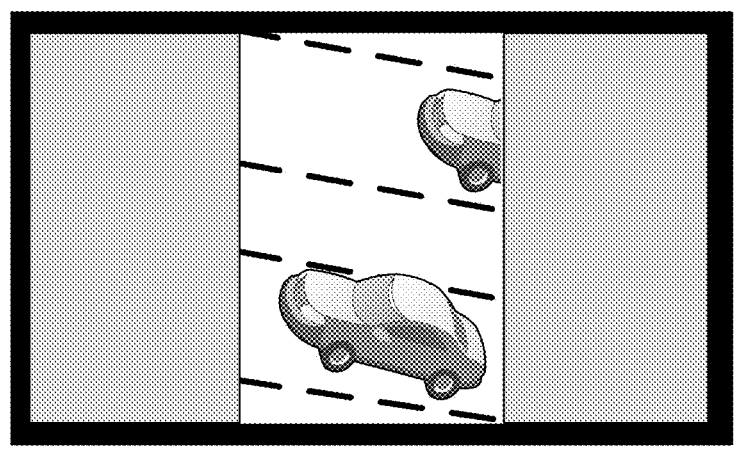
FIGS. 11-12 illustrate sample videogame clip screen displays with offset display modes.

FIG. 11 illustrates a clip output acquired or played within the game in a horizontal mode but displayed in a landscape mode. This shows the image height 162 in a square format, in this example using a 16:16 aspect ratio.

Figure 12:
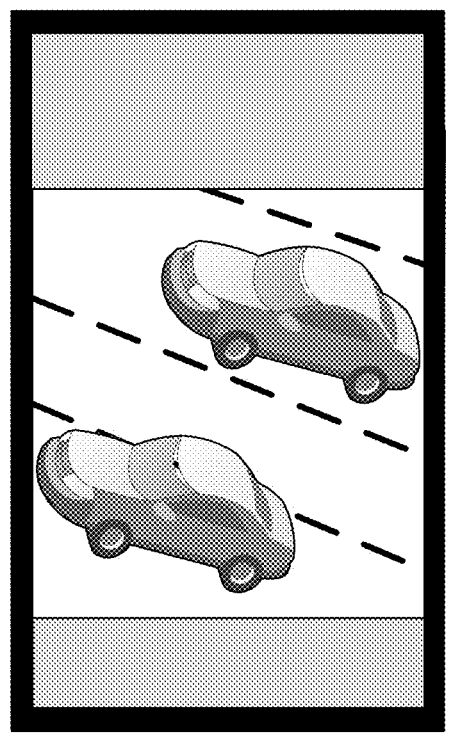

FIG. 12 illustrates one embodiment of modifying clip distribution accounting for change in orientation. The gameplay sequence is in a portrait mode, but the clip segment is shown in a landscape mode. Here, gray or shaded (e.g. black-out) segments are used to present a full screen display. In other embodiments, the segments can be secondary or meta-data display window content, such as information on the game itself and user (player) information for example.

Figure 13:
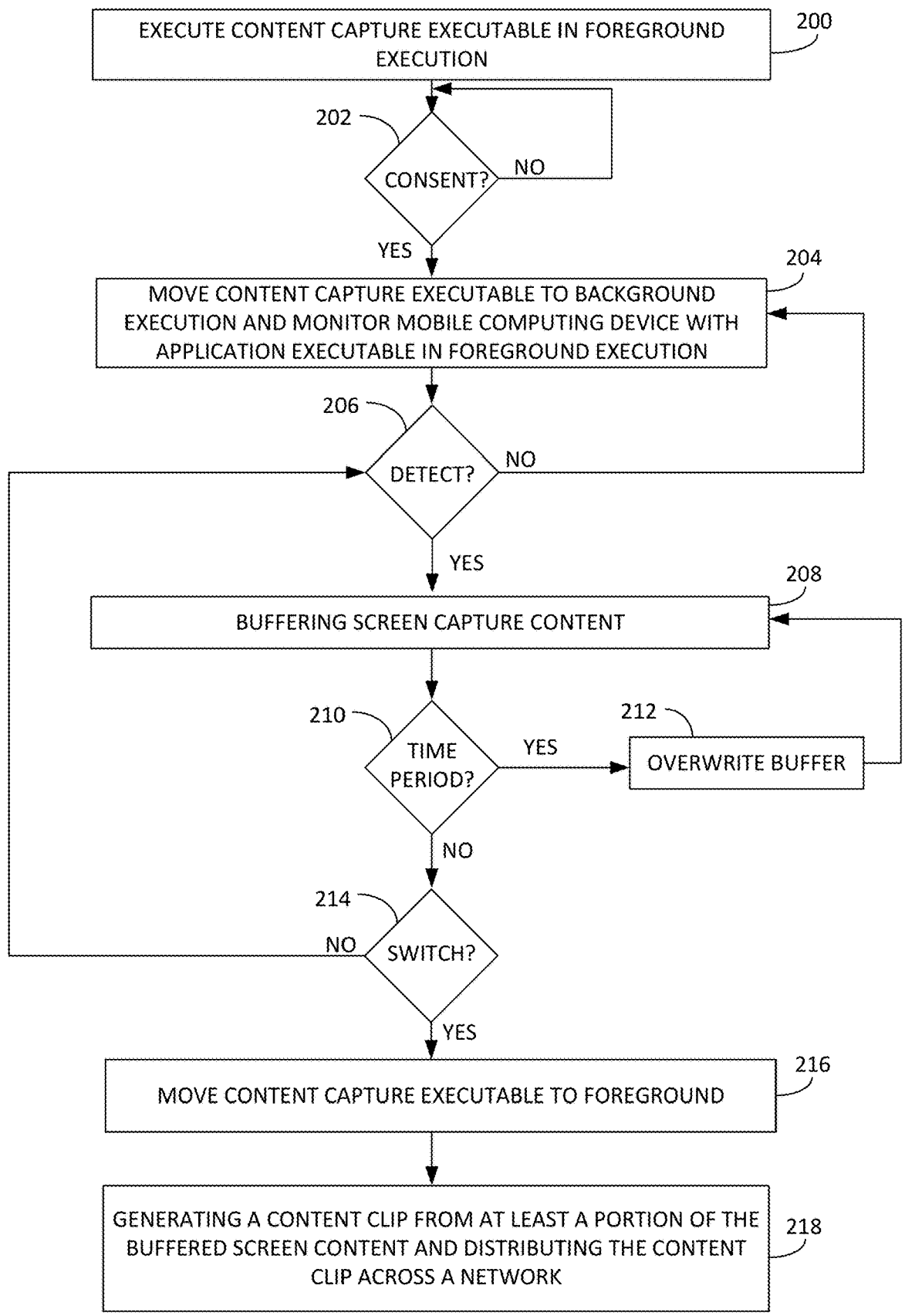
FIG. 13 illustrates a flowchart of the steps of one embodiment of a method for clip generation of an application executable in a mobile computing device.

In addition to the application being a game, the application can be any type of mobile device executable. FIG. 13 illustrates a flowchart of the steps of one embodiment of a method for mobile application clip generation. The steps of FIG. 13 are similar in nature to steps of FIG. 2.

The FIG. 13 method is a computerized method for mobile application clip detection on a mobile computing device executing a mobile operating system software. As noted above, one type of mobile operating system software may be Andriod® OS software available from Alphabet, Inc. The mobile computing device includes a processing device that executes executables via the mobile operating system software. The mobile computing device additionally coordinates user interfacing via one or more mobile device user interface (s).

As noted above, the mobile operating system operates executables in either a foreground execution or a background execution. This execution is determined based on engagement with user interfacing functionality. When an application executes in the foreground execution, the display device provides an active display of the application and the user is able to directly interact with the application via the user interface(s). When the application execution is in the background execution, the display and the user interaction can be disabled. Based on available display screen space, all or parts of the background execution can be visible, but direct user engagement with the application via the interface(s) is disabled, focusing instead on the application executing in the foreground execution.

In FIG. 13, step 200 is executing a content capture executable in the foreground execution. By way of example, FIG. 5 illustrates one embodiment of a content capture executable, executing in the foreground execution. Decision step 202 determines if the user grants consent to recording content. If consent is not granted, the method reverts to step 200 and the content capture executable is not granted permission to record or capture content.

If consent is granted, step 204 is moving the content capture executable to the background execution and monitoring the mobile computing device, along with executing an application executable in the foreground execution.

Here, the application executable can be any suitable application executable in the mobile operating system. The application executable is not limited to gaming applications. By way of example, the application executable can be a healthcare tracking application recording heart rate and physical information. In another example, the application executable can be a productivity application, such as a language tutorial application. In another example, the application executable can be a multi-media application, such a video and/or audio viewer application playing pre-existing content. The above application executables are exemplary in nature and not a restrictive list.

With the content capture executable in the background execution and the application executable in the foreground execution, step 206 is a detecting step. While in background execution, the content capture executable operates to detect capturable content from the application executable executing in the foreground execution.

The method and system can activate content capture based on any number of factors. The content capture executable, in the background execution, can for example detect increased wireless network traffic associated with a mobile application, indicating a higher degree of user interaction. In another example, the content capture executable may detect the user engaging in interacting on the touchscreen keyboard indicating typing content on the mobile application.

In another embodiment, content capture can be conducted based on a user trigger initiation. While the content capture executable remains in background execution, one embodiment may include a trigger command embedded or linked within the mobile OS platform or within the executable application in the foreground execution. For example, the OS may include a triggering hotkey based on the user touching or otherwise interacting with the mobile device. In another example, the executable application may include an API or some communication software for transmitting a triggering command to the content capture executable. In this example, the user can manually trigger the content capture by the content capture executable in the background execution.

Upon detecting capturable content, step 208 is buffering screen content of the capturable content. In step 208, the output display from the application executable is both provided to the mobile device output display and also written into a first memory device. In this step, the content is dynamically captured without disruption to the application executable. Based on available memory space or other factors, this allows for the user to retroactively seek content capture as well as clip generation. For example, if a user is engaged in a social media application and only later wishes or thinks to capture what just occurred in the application, this function is available because of steps 208 and 210.

Mobile computing devices have limited memory resources. Step 210 provides for buffering screen content for a defined time period. In one example, the time period can be set at 30 seconds or can be modified based on available memory resources. If the capturing of content exceeds the time period, step 212 is to overwrite buffer content prior in time. In the example of a 30 second buffer, buffered content is overwritten in a circular fashion keeping the prior 30 seconds of captured content.

In another embodiment, the buffered time period can correspond to a clip time limit associated with a distribution platform. For example, if a particular clip distribution platform has a 60 second clip time limit, the buffering time period can be set based on this time limit.

In step 214, the method detects if the user requests or the operating system software otherwise seeks to move the content capture executable to the foreground execution. This detection can use any suitable recognition technique, for example, but not limited to, the user hitting a hotkey or multi-button sequence.

Step 216, the content capture executable is then moved to the foreground execution. Herein, the user then directly interacts with the content capture executable.

Step 218 is generating a content clip from at least a portion of the buffered screen content. Similar to generating a content clip described above, the user can modify, truncate, edit, or otherwise manipulate the buffered content. This may include software interfacing, for example of a touchscreen interface to cut or clip portions of the stored content. Generating the content clip can include adding additional content, such as an introduction screen, text overlay, a screen name or online identifier, etc.

Step 218 may further include distributing the content clip across a network connection. For example, this clip generation can be to a designated distribution platform or can be associated with other distribution techniques.

One example of a designated distribution platform can be capturing heart rate and health data and distributing directly to an online workout forum. Another example of a designated distribution platform can be transmission or uploading to a dedicated clip sharing site, such as a social media or networking site. Other distribution techniques can include adding the clip to an email, text message, or other types of communication applications.

In one example, a user may be executing a mobile social networking application and communicating with a group of users. In this example, the user may wish to retroactively capture the interactions, for example if there is a humorous interplay between various users within the application.

In addition to the clip generation and distribution, interaction with the content capture executable (in step 216 above) can include clip saving commands. For example, if the user is interacting with the application executable and wishes to acquire multiple clips or wishes to save an existing occurrence in the application executable but does not wish to leave or end the application executable, a save command can pass the currently-buffered clip to a more permanent storage location for later editing and clip generation (steps 218, 220). Then, the user can re-engage the application executable, where further output content be dynamically buffered via the content capture in the background execution.

The method and system may additionally restrict or prohibit content capture for some executable applications. For example, executable applications may wish to exclude content capture for security or legal reasons. In one example, a video player application may exclude content capture for avoiding copyright violations. In another example, a banking application may exclude content capture for identity protection purposes.

Therefore, one embodiment includes determining an identity of the application executable executing in the foreground on the mobile computing device. In mobile operating systems, most applications include an application identifier. The content capture executable may therefore reference the application identifier against a reference or look-up table with approved applications. If the application executable is approved, or at least not excluded, the content capture executable may then be authorized to perform content capture operations, subject to user approval. Similarly, if the application executable is not approved, the content capture executable may prohibit content capture operations.

In one embodiment, the user operating the mobile computing device may transition between multiple application executables. The method and system may utilize varying embodiments of the content capture executable. In one embodiment, the content capture executable may pause or terminate content capturing from the first application prior to any further capture operations. In this example, if a second application is brought to the foreground execution, the content capture executable may need to reverify that content capture is acceptable.

In another embodiment, the content capture executable may operate by capturing the screen content relative to the operating system level. In this example, a user may generate a clip that includes displaying transitioning between two or more applications. For example, if the clip is a tutorial on how to integrate or coordinate content between different mobile applications, the clip can display the transition between the different applications. In one embodiment, the applications are approved for content capture and/or clip distribution.

The present method and system may include additional features to emphasize and optimize storage location within the mobile device. For example, one embodiment may include using partial frame recording techniques, such as storing anchor or key frames and storing per-frame adjustments between anchor frames. In another example, storage of frames may use compression techniques.

In one embodiment, the computerized method and system may operate one or more techniques for additionally overcoming buffer mobile device buffer limitations. Maximum content capture buffer size is limited by the operating system. It is typical for the mobile operating system to cap the maximum available RAM per software executable. One technique for overcoming these restrictions is launching one or more secondary executables providing content capture. In this embodiment, the original content capture executable operates as the primary executable including operating instructions to manage the secondary executables. Via communication between the primary and secondary executables to transfer buffer data to these secondary processes.

When a user directs clip generation, the primary executable retrieves secondary executable buffer content on demand using the same communication between these executables. Wherein, the spawning of secondary executables mitigates the RAM per process restrictions by increasing the number of executables and therein scaling up the number of available RAM storage space.

In a further embodiment, clip detection and/or generation can be utilized OS software shortcuts available to the user. For example, an OS may include a hotkey or button clip designation for an optimized shortcut. One example of a shortcut is pressing a home button and the power button to capture a screenshot. Personalization routines can modify or use existing OS shortcuts for clip generation. For example, if the screenshot capture shortcut is modified to be a clip capture during execution of the content capture executable, this shortcut can be used in lieu of or supplement to the dynamic clip detection and storage described herein.

Herein, the present method and system allows for clip detection, recordation, and distribution within a mobile computing device operating a mobile OS. The method and system operates within the processing and memories restrictions of the mobile platform, while allowing for videogame capture and distribution.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for mobile application clip detection and capture on a mobile computing device executing a mobile operating system software, the mobile computing device including a processing device located therein, the processing device executing executables via the mobile operating system software and coordinating user interfacing via at least one mobile device user interface, the method comprising:

executing a content capture executable via the mobile operating system software, executing the content capture executable in a foreground execution by the processing device, wherein the foreground execution is execution by the processing device with active user interfacing including a graphical output display and receiving user input interaction via the mobile device user interface;

while the content capture executable executes in the foreground execution, receiving a user consent from a user via the mobile device user interface, the user consent for capturing screen content by the content capture executable executing on the processing device of the mobile computing device;

transferring the content capture executable from the foreground execution to a background execution, wherein the background execution is execution by the processing device without the active user interface including without the graphical output display and without the receiving user input interaction via the mobile device user interface;

detecting capturable content from an application executable executing in the foreground execution on the processing device based on monitoring of processing operations;

in response to instructions from the content capture executable in the background execution and based on the detecting the capturable content, buffering screen content of the capturable content of the application executable in a first memory device for a first period of time; and transferring the content capture executable into the foreground execution of the mobile computing device, including receiving a clip generation command from the user and generating a content clip from at least a portion of the screen content in the first memory device based on the clip generation command.

2. The computerized method of claim 1 further comprising:

receiving a clip distribution command from the user and distributing the content clip across a networked connection based on the clip distribution command.

3. The computerized method of claim 2 further comprising:

generating user profile information associated with the user who provided the user consent for capturing screen content; and adding the user profile information to the content clip.

4. The computerized method of claim 3, wherein the adding the user profile information to the content clip is performed prior to the distributing the content clip across a networked connection.

5. The computerized method of claim 2, wherein the distributing the content clip across the network connection further comprises:

distributing the content clip to a content distribution server.

6. The computerized method of claim 1 further comprising:

determining an identity of the application executable executing the foreground on the mobile computing device;

comparing the identity of the application executable against a reference table, wherein the reference table includes a list of application executables approved for content distribution; and authorizing the buffering of the screen content if the application executable is approved for content distribution based on the reference table.

7. The computerized method of claim 6 further comprising:
prohibiting the buffering of the screen content if the application executable is not approved for content distribution based on the reference table.

8. The computerized method of claim 6, wherein the identity of the application executable is determined using an application identifier.

9. The computerized method of claim 1, wherein the first memory device is a circular buffer.

10. The computerized method of claim 9, wherein upon expiration of a second period of time, the buffering of the screen content overwrites previously stored screen content stored in the circular buffer.

11. A system for mobile application clip detection and capturing, the system comprising:
a mobile computing device executing a mobile operating system software, the mobile computing device including a processing device and a memory device storing executable instructions therein, the processing device executing executables via the mobile operating system software and coordinating user interfacing via at least one mobile device user interface, in response to the executable instructions, operative to:
execute a content capture executable via the mobile operating system software, executing the content capture executable in a foreground execution by the processing device, wherein the foreground execution is execution by the processing device with active user interfacing including a graphical output display and receiving user input interaction via the mobile device user interface;
while the content capture executable executes in the foreground execution, receiving a user consent from a user via the mobile device user interface, the user consent for capturing screen content by the content capture executable executing on the processing device of the mobile computing device;
transferring the content capture executable from the foreground execution to a background execution, wherein the background execution is execution by the processing device without the active user interface including without the graphical output display and without the receiving user input interaction via the mobile device user interface;
detecting capturable content from an application executable executing in the foreground execution on the processing device based on monitoring of processing operations;
in response to instructions from the content capture executable in the background execution and based on the detecting the capturable content, buffering screen content of the capturable content of the application executable in a first memory device for a first period of time; and
transferring the content capture executable into the foreground execution of the mobile computing device, including receiving a clip generation command from the user and generating a content clip from at least a portion of the screen content in the first memory device based on the clip generation command.

12. The system of claim 11, the processing device, in response to the executable instructions, further operative to:
receive a clip distribution command from the user and distributing the content clip across a networked connection based on the clip distribution command.

13. The system of claim 12, the processing device, in response to the executable instructions, further operative to:
generate user profile information associated with the user who provided the user consent for capturing screen content; and
add the user profile information to the content clip.

14. The system of claim 13, wherein the adding the user profile information to the content clip is performed prior to the distributing the content clip across a networked connection.

15. The system of claim 12, wherein the processing device operative to distribute the content clip across the network connection includes distributing the content clip to a content distribution server.

16. The system of claim 11, the processing device, in response to the executable instructions, further operative to:
determine an identity of the application executable executing the foreground on the mobile computing device;
compare the identity of the application executable against a reference table, wherein the reference table includes a list of application executables approved for content distribution; and
authorize the buffering of the screen content if the application executable is approved for content distribution based on the reference table.

17. The system of claim 16, the processing device, in response to the executable instructions, further operative to:
prohibit the buffering of the screen content if the application executable is not approved for content distribution based on the reference table.

18. The system of claim 16, wherein the identity of the application executable is determined using an application identifier.

19. The system of claim 11, wherein the first memory device is a circular buffer.

20. The system of claim 19, wherein upon expiration of a second period of time, the buffering of the screen content overwrites previously stored screen content stored in the circular buffer.

* * * * *